United States Patent Office

R. C. GRAVES, OF BARNESVILLE, OHIO.

*Letters Patent No. 74,343, dated February 11, 1868.*

IMPROVED ROOFING-COMPOSITION.

The Schedule referred to in these Letters Patent and making part of the same.

TO ALL WHOM IT MAY CONCERN:

Be it known that I, R. C. GRAVES, of Barnesville, in the county of Belmont, and State of Ohio, have invented certain new and useful Improvements in Composition for Roofing; and I do hereby declare that the following is a full, clear, and exact description thereof.

The manner in which I make my composition is as follows: I take forty gallons of coal-tar, thirty gallons pulverized slate, ten gallons pulverized clay, five pounds boiled rice, one pound glue, one pound terra de sienna, and one gallon linseed oil. I mix the coal-tar, slate, and clay together. I then boil the rice and strain it through a fine sieve, and liquefy the glue by heat. I then add the rice, glue, and terra de sienna to the linseed oil, and thoroughly incorporate the entire compound together. It is then ready for use, and may be applied with a brush or trowel. This makes a roofing-compound impervious to water, unaffected by heat or cold, and, when it hardens, perfectly fire-proof.

Having thus described my invention, what I claim as new, and desire to secure by Letters Patent, is—

A composition for covering roofs, composed of the within-described ingredients, substantially in the manner specified.

In testimony that I claim the foregoing as my own, I affix my signature in presence of two witnesses.

R. C. GRAVES.

Witnesses:
    BENJ'N MACKALL,
    D. C. BALON.